US007535502B2

(12) United States Patent
Rambaldi et al.

(10) Patent No.: US 7,535,502 B2
(45) Date of Patent: May 19, 2009

(54) PIXEL CORRECTION SYSTEM AND METHOD FOR CMOS IMAGERS

(75) Inventors: Roberto Rambaldi, Bologna (IT); Marco Tartagni, Meldola (IT); Alan H. Kramer, Berkeley, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 699 days.

(21) Appl. No.: 10/613,830

(22) Filed: Jul. 3, 2003

(65) Prior Publication Data

US 2004/0095488 A1    May 20, 2004

Related U.S. Application Data

(62) Division of application No. 08/964,763, filed on Nov. 5, 1997, now Pat. No. 6,618,084.

(51) Int. Cl.
    H04N 9/64    (2006.01)
(52) U.S. Cl. ......................... 348/247; 348/246; 348/245
(58) Field of Classification Search ................. 348/247, 348/210, 246, 245
    See application file for complete search history.

(56) References Cited

U.S. PATENT DOCUMENTS

| 4,399,464 A |   | 8/1983  | Hix et al. |         |
|-------------|---|---------|------------|---------|
| 4,541,116 A |   | 9/1985  | Lougheed   |         |
| 4,567,525 A |   | 1/1986  | Endo       |         |
| 4,701,784 A |   | 10/1987 | Matsuoka   |         |
| 4,805,023 A |   | 2/1989  | Younse     |         |
| 4,816,910 A | * | 3/1989  | Hashimoto et al. | 348/247 |
| 4,858,013 A |   | 8/1989  | Matsuda    |         |
| 5,047,861 A | * | 9/1991  | Houchin et al. | 348/247 |

(Continued)

FOREIGN PATENT DOCUMENTS

EP    0350328    1/1990

OTHER PUBLICATIONS

Eiji Oba, et al., "A 1/4 Inch 330k Square Pixel Progressive Scan CMOS Active Pixel Image Sensor," Feb. 7, 1997, Digest of Technical Papers, pp. 180-181.

(Continued)

*Primary Examiner*—James M Hannett
(74) *Attorney, Agent, or Firm*—Lisa K. Jorgenson; Weaver Austin Villeneuve & Sampson

(57) ABSTRACT

Disclosed is a fault tolerant CMOS image sensor that includes circuitry for identifying defective pixels and masking them during image generation. Masking may involve, in one example, replacing the output of a given pixel with an average of the output of surrounding non-faulty pixels. Thus, while image sensors may be fabricated with some number of faulty pixels, the images produced by such sensors will not have undesirable bright or dark spots. The disclosed sensor includes (a) one or more pixels (active or passive) capable of providing outputs indicative of a quantity of radiation to which each of the one or more pixels has been exposed; and (b) one or more circuit elements electrically coupled to the one or more pixels and configured to identify and correct faulty pixels in the CMOS imager. The one more pixels each include a photodiode diffusion formed in a well and a tap to power or ground also formed in the well. The disclosed sensor also identifies pixels that were initially acceptable but later became defective. The newly defective pixels so identified may then be masked to thereby increase the CMOS detector lifetime.

20 Claims, 8 Drawing Sheets

U.S. PATENT DOCUMENTS

| | | | |
|---|---|---|---|
| 5,101,271 A | | 3/1992 | Andrews |
| 5,144,446 A | * | 9/1992 | Sudo et al. ............... 348/246 |
| 5,153,421 A | | 10/1992 | Tandon |
| 5,168,379 A | | 12/1992 | Mori |
| 5,204,948 A | | 4/1993 | Kato |
| 5,416,516 A | * | 5/1995 | Kameyama et al. ......... 348/246 |
| 5,451,768 A | | 9/1995 | Hosier |
| 5,532,484 A | * | 7/1996 | Sweetser et al. ............ 250/332 |
| 5,654,537 A | * | 8/1997 | Prater ..................... 250/208.1 |
| 5,796,430 A | * | 8/1998 | Katoh et al. ................ 348/246 |
| 5,886,353 A | * | 3/1999 | Spivey et al. .......... 250/370.09 |
| 6,057,539 A | | 5/2000 | Zhou et al. |

OTHER PUBLICATIONS

McGrath, R. Daniel, et al., "Current-Mediated, Current-Reset 768.times.512 Active Pixel Sensor Array," Feb. 7, 1997, Digest of Technical Papers, pp. 182-183.

Eric R. Fossum, "CMOS Image Sensors: Electronic Camera On a Chip," Dec. 10-13, 1995, International Electron Devices Meeting Technical Digest, pp. 17-25.

Goodenough, Frank, "Get Ready for TV Cameras on a Chip," Electronic Design Report, vol. 44, No. 4, 1996, Cleveland, OH.

* cited by examiner

FIG. 5

PIXEL CORRECTION SYSTEM AND METHOD FOR CMOS IMAGERS

This is a Divisional application of prior application Ser. No. 08/964,763 filed on Nov. 5, 1997 now U.S. Pat. No. 6,618,084, the disclosure of which is incorporated herein by reference.

BACKGROUND OF THE INVENTION

The present invention relates to an integrated circuit architecture for CMOS imagers. More specifically, the present invention relates to methods and apparatus for masking or correcting faults in individual pixels of CMOS imagers.

CMOS image sensors are now becoming competitive with charge coupled device ("CCD") array image sensors. Potential applications include digital cameras, night time driving displays for automobiles, and computer peripherals for document capture and visual communications.

Since the 1970s, CCD arrays have dominated the electronic image sensor market. They have outperformed CMOS array sensors in most areas, including quantum efficiency, optical fill factor (the fraction of a pixel used for detection), charge transfer efficiency, readout rate, readout noise, and dynamic range. However, the steady improvement in CMOS technology (including increasingly small device size) has moved CMOS image sensors into a competitive posture. Further, in comparison to CCD technology, CMOS technology provides lower power consumption, increased functionality, and potentially lower cost. Researchers now envision single chip CMOS cameras having (a) integrated timing and control electronics, (b) a sensor array, (c) signal processing electronics, (d) an analog-to-digital converter, and (e) interface electronics. See Fossum, "CMOS Image Sensors: Electronic Camera On A Chip," 1995 IEDM Technical Digest, Wash. DC, Dec. 10-13, 1995, pp. 17-25 which is incorporated herein by reference for all purposes.

CCD arrays are limited in that all image data is read by shifting analog charge packets from the CCD array interior to the periphery in a pixel-by-pixel manner. Unfortunately, the pixels of the CCD array are not randomly addressable. In addition, due to voltage, capacitance, and process constraints, CCD arrays are not well suited to integration at the level possible in CMOS integrated circuits. Hence, any supplemental processing circuitry required for CCD sensors (e.g., memory for storing information related to the sensor) must generally be provided on separate chips. This, of course, increases the system's cost.

A persistent problem of both CMOS and CCD image sensor technologies is image degradation due to faulty pixels. Such faulty pixels arise from processing variations inherent in fabrication of numerous sensor chips. A pixel's fault may be manifested by an output indicative of a radiation exposure that does not accurately reflect the actual radiation exposure to which the pixel was exposed. For example, a pixel that outputs more charge than is expected upon exposure to a particular amount of radiation appears as a bright spot in an image. Similarly, a pixel that outputs less charge than expected appears as a dark spot.

Typically, image sensors are tested after fabrication to identify the number of faulty pixels that they contain. If any sensor has more than a specified number of faulty pixels, it must be rejected. Thus, sensor yield is limited by the number of faulty pixels typically produced on a chip. Not surprisingly, wide area sensors having large numbers of pixels have relatively low yields because they tend to have higher numbers of faulty pixels (the number of faulty pixels per total number of pixels is approximately constant for a given fabrication technology).

While careful screening of image sensors after fabrication can locate defective arrays, it cannot prevent sensors from degrading during normal use. Pixels sometimes develop such faults during normal operation. Unfortunately, no effective mechanism exists for identifying and correcting such faults.

What is needed therefore is an improved image sensor that can mask or otherwise correct defective pixels soon after the sensor is fabricated and during its lifetime.

SUMMARY OF THE INVENTION

The present invention provides a fault tolerant radiation imager such as a CMOS imager. Such image sensor includes circuitry for masking and/or correcting defective pixels during image generation. Masking may involve, in one example, replacing the output of a given pixel with an average of the outputs of surrounding non-faulty pixels. Correction may involve increasing or decreasing the output level from a pixel to be corrected. Thus, while image sensors may be fabricated with some number of faulty pixels, the images produced by such sensors will be superior to those produced by sensors that do not have such masking or correcting mechanisms. Further, sensor, yield may be improved because even those sensors having more than the traditionally allotted number of defects may be used (so long as the defective pixels are appropriately masked or corrected). In one preferred embodiment, pixels that were initially good and later become defective may be identified at the time they become defective. The newly defective pixels so identified may then be masked or corrected as described to thereby increase the CMOS detector lifetime.

One aspect of the present invention provides a method of masking faulty pixels that may be characterized by the following steps: (a) exposing an imager to radiation; (b) identifying a faulty pixel in the imager; (c) determining outputs of a plurality of other pixels located about the faulty pixel; and (d) masking an output of the faulty pixel using the outputs of the plurality of other pixels. Then a masked output of the faulty pixel can be provided in an image produced by the imager. Preferably, the system identifies the faulty pixel by accessing memory associated with the imager to determine the location of the faulty pixel in the imager. Then to generate an image corrected for the faulty pixel, the method may also require conversion of the output of the pixels (including the masked output) from an analog format to a digital format prior to masking the pixel's output.

In one embodiment, masking the output of a faulty pixel involves replacing its output with an output value based exclusively on the output of multiple surrounding pixels. For example, the corrected output may be obtained by interpolating output values of at least two pixels surrounding the at least one faulty pixel. In color imagers, the pixels of the imager can discriminate between multiple colors and the faulty pixel therefore will be designated to detect radiation of a single color. Preferably, in such cases, the plurality of other pixels chosen to mask the output of the faulty pixel are only those surrounding pixels that are designated to detect radiation of the same color as the faulty pixel.

It may not be necessary to totally mask the output of each of the faulty pixels. For example, some pixels may not be completely corrupted, in which case their outputs could be corrected rather than masked. In one instance, the faulty pixel may be known to have an output that is 20% lower than appropriate. Thus, the output of that pixel may simply be increased by 25% before producing the image.

Of course, some technique for identifying faulty pixels must be conducted initially (when the imager is produced) or periodically over its lifetime. In one embodiment, the system electronically tests a selected pixel according to the following sequence: (i) electronically resetting the selected pixel to a defined charge (e.g., the charge associated with a dark value in an image); (ii) reading the selected pixel's output; and (iii) comparing the selected pixel's output to an expected value based upon the defined charge provided to the selected pixel. If the selected pixel's output significantly deviates from the expected value, the system designates the selected pixel as faulty. Alternatively, the conducted test may also be an optical test in which the imager is exposed to radiation of a known intensity for a known duration. The outputs of the pixels are then compared to expected values as described above.

In the case of an electronic test and where the selected pixel includes an n-well and a p-diffusion photodiode, electronically resetting the selected pixel requires injecting a quantity of negative charge into the p-diffusion. In photodiodes of the opposite conductivity type, negative charge is removed from an n-type diffusion during reset.

The test results may be interpreted as follows: if the selected pixel's output significantly deviates from the expected value, the system determines whether the selected pixel is partially or completely corrupted. Thereafter, masking or correcting the output of the selected pixel employs a first technique for a partially corrupted pixel and a second technique for a completely corrupted pixel. Because the second technique involves a completely corrupted pixel, little if any information from the output of the pixel may be used. Thus, the second masking technique may involve interpolation or otherwise averaging the outputs of pixels surrounding the completely corrupted pixel. The first technique may involve using the output from the pixel—simply increasing or decreasing that output by a fixed percentage or magnitude.

To automatically recall the faulty pixel identities prior to image generation, the test method may be concluded by storing the location of the one or more faulty pixels in a memory. In appropriate instances, it may also involve storing data specifying whether each of the one or more faulty pixels is partially or completely corrupted.

Another aspect of the invention provides an imager that may be characterized as including the following elements: (a) one or more pixels capable of providing outputs indicative of a quantity or a type or both the quantity and type of radiation to which each of the one or more pixels has been exposed; (b) one or more circuit elements electrically coupled to the one or more pixels and configured to mask or correct faulty pixels in the imager; and (c) a memory configured to store the locations of the faulty pixels. Preferably, these various elements are provided on a single integrated circuit chip.

The imager may also include one or more voltage sources capable of delivering a voltage to the photodiode diffusions of the one or more pixels (typically to reset the pixels' states). It may further include one or more charge integrators capable of measuring the pixel outputs. Still further it may include an analog-to-digital converter capable of receiving analog outputs from the one or more pixels, converting the analog outputs to digital signals, and providing the digital signals to the one or more circuit elements such that the one or more circuit elements can identify faulty pixels. In an especially preferred embodiment, the plurality of pixels is arranged in an array such that each of the pixels in the plurality of pixels is separately addressable.

In many CMOS imagers, the one more pixels will each include a photodiode diffusion formed in a well and a tap to power or ground also formed in the well. Such pixels may be of an active or passive design.

Another aspect of the invention provides a system for producing an image of an object. This system includes an imager of the type described above and one or more components for outputting an image resulting from the outputs of the one or more pixels. The image may be a photograph in the case of a digital camera for example.

These and other features and advantages of the invention will be described below in the Detailed Description section with reference to the appended drawings.

BRIEF DESCRIPTION OF THE DRAWINGS

FIG. 5 is an illustration of the pixel arrangement in a color imager, presented to illustrate how pixel correction can be conducted in color imagers.

DETAILED DESCRIPTION OF THE PREFERRED EMBODIMENTS

The invention will be described with reference to certain preferred embodiments set forth below. Specifically, the invention will be described with reference to a particular CMOS sensor employing depletion mode photodiodes. It should be understood that the invention is in no way specifically limited to these embodiments. For example, the methods and systems described herein may be profitably applied to photogate arrays, CCD arrays and virtually any other type of radiation imaging array. Further, while the CMOS photodiode array design presented herein is a "passive" design, the principles of this invention can be applied to other designs such as active pixel designs.

Figure 1:
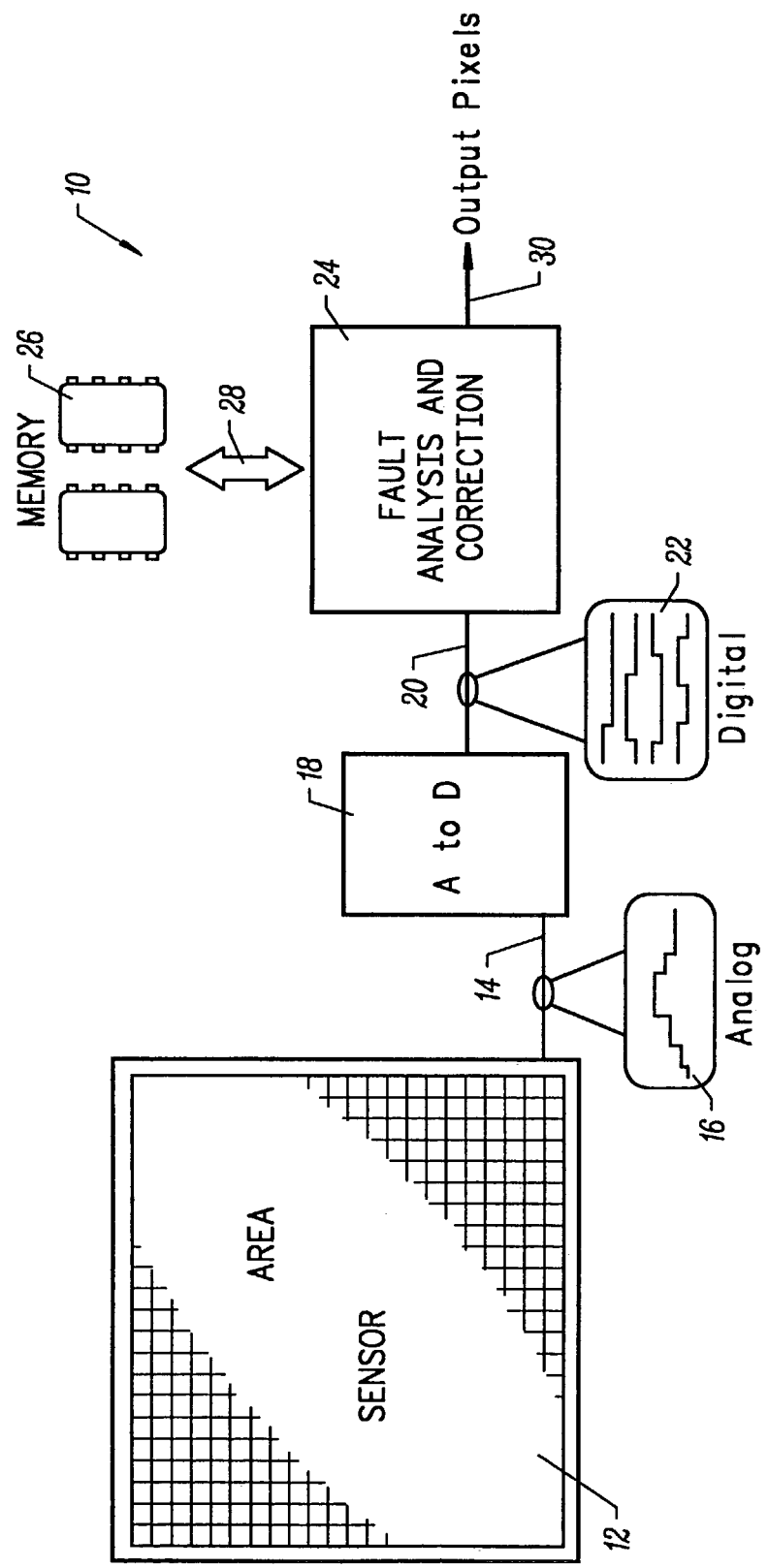
FIG. 1 is a block diagram illustrating high level functional blocks employed in a CMOS imager implementing the fault tolerant imager of the present invention.

FIG. 1 presents one preferred system architecture for implementing a CMOS imager in accordance with this invention. Preferably, all elements of the depicted system are implemented on a single integrated circuit chip. The figure presents an imager 10 including four primary elements: a pixel array area sensor 12, an analog-to-digital converter 18, a fault analysis and correction block 24, and a memory 26 for storing fault and correction data.

Area sensor 12 includes a plurality of regularly arranged pixels each capable of responding to radiation impinging on the sensor. Often, as in the case of most digital cameras, the radiation will be visible electromagnetic radiation. Detection of other types of radiation is within the purview of this invention. Each pixel produces an output indicative of the radiation intensity over time (integral of intensity with time) striking the pixel. In one specific embodiment, area sensor 112 includes an array of 1024 (vertical direction) by 1024 (horizontal direction) pixels, but of course the actual array dimensions will depend upon the application and the scale of the IC fabrication technology. In operation, an optical image may be directed onto area sensor 12 such that spatial and/or temporal variations in light intensity (or some other radiation feature such as wavelength) may be temporarily recorded by the individual pixels making up sensor 12.

The signals from the individual pixels of sensor 12 are output over one or more lines 14 as analog signals 16. These analog signals 16 are received by analog-to-digital converter 18 which converts them to digital signals 22 and outputs such digital signals over a line 20.

Digital signals 22 are then received by the fault analysis and correction block 24 which communicates with memory 26 over a memory connection 28 (e.g., a bus) in order to appropriately mask the output of faulty pixels in area sensor 12. Fault analysis and correction block 24 thereby produces a corrected set of output pixels which it sends over a line 30 to image display circuitry.

While the individual elements of system 10 may be implemented on different physical structures, area sensor 12, analog-to-digital converter 18, and fault analysis/correction block 24 are preferably provided on a single integrated circuit chip. In addition, it may be desirable to include memory 26 on the same chip. Memory 26 should be made as small as possible yet large enough to store all necessary information for correction/masking of each faulty pixel. As most sensors can be expected to have only a few faulty pixels, memory 26 typically need not be very large. Its size will largely depend upon the size of the pixel array itself. Typically, it can be expected that no more than 0.1% of the pixels will ever be faulty in a functional imager. One might expect no more than two or three bytes need be set aside for storing the location and correction information associated with each defective pixel. Based on this logic, memory 26 may typically be between about 10 kilobits and 1 Megabit. Further, memory 26 may take many forms such as SRAM, ROM (EEPROM, flash memory, or EPROM), DRAM, etc.

One of the most significant benefits of CMOS-based image sensors is their easy integration with on-chip analog-to-digital converters. Preferably, the analog-to-digital converter will consume little power and occupy little area, yet meet the pixel processing rate at the resolution required of the system's application. It is possible to have a single analog-to-digital converter for the entire array (operating at the pixel rate), a single converter for each pixel (operating at the frame rate), a converter for each column of the array (operating at the line rate), or some other division of labor.

Figure 2A:
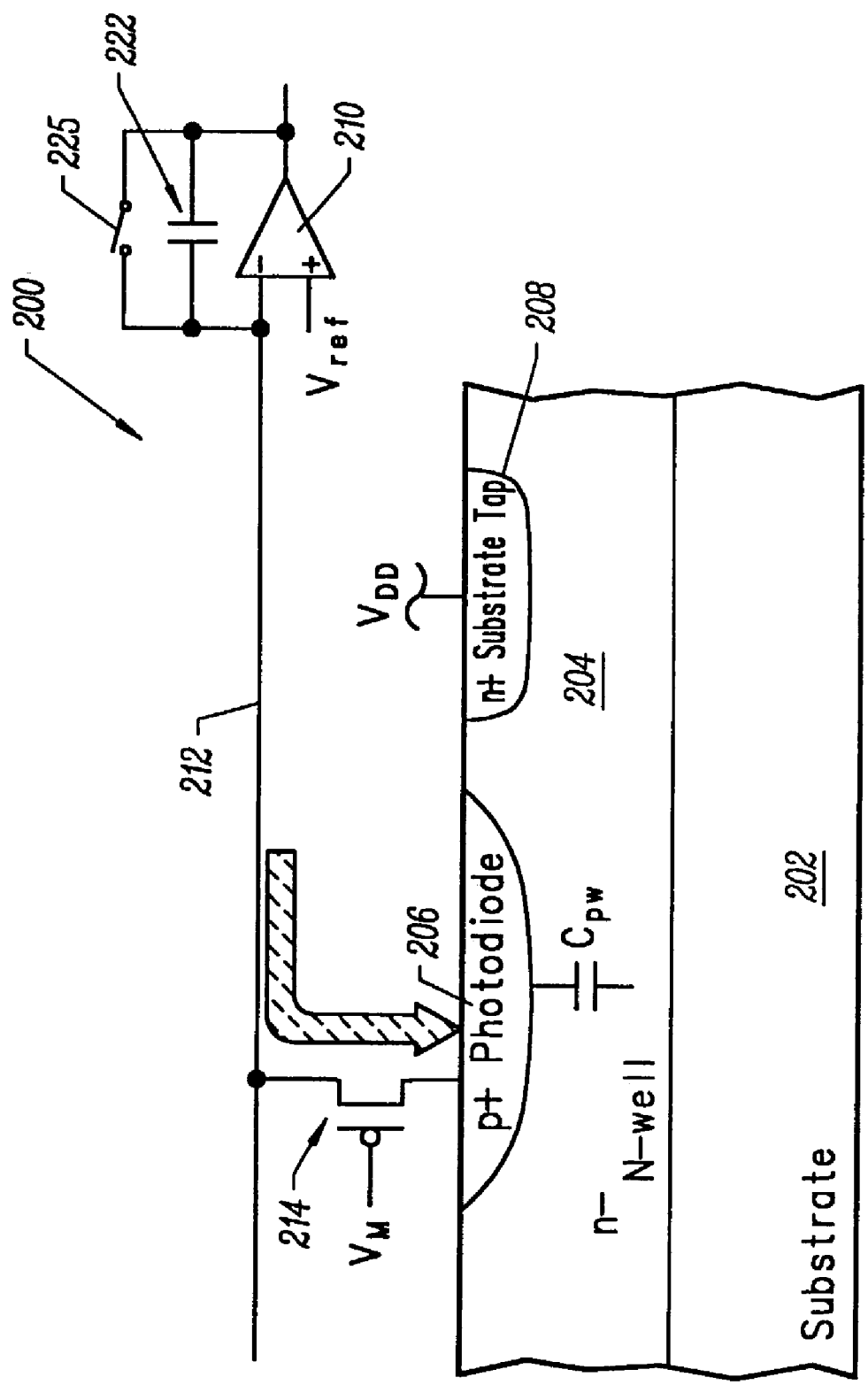
FIG. 2A is a cross-sectional diagram of a passive photodiode pixel, of a type suitable for use with the CMOS imager of FIG. 1, being reset.
Figure 2B:
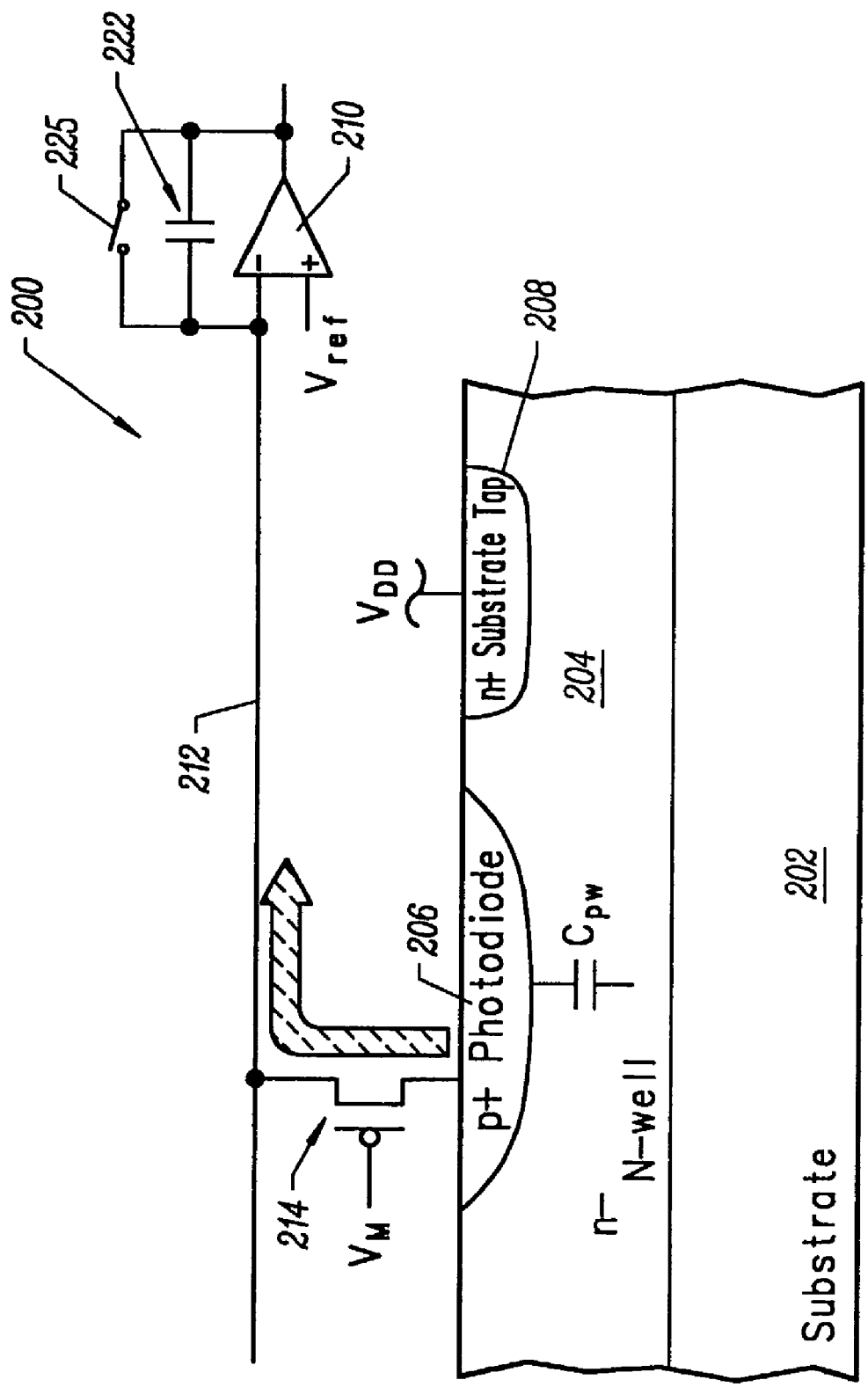
FIG. 2B presents the same cross-sectional diagram presented in FIG. 2A, but showing how the reset charge on the pixel is read out to determine if the pixel is faulty.

FIGS. 2A and 2B present side sectional views of a single passive pixel. In FIG. 2A, the pixel is being reset for testing, and in FIG. 2B, the pixel's accumulated charge is measured to determine whether the pixel has been corrupted. FIG. 2B also illustrates the state of a pixel when its output is being read for normal imaging.

As depicted in FIGS. 2A and 2B, a pixel 200 is formed on a semiconductor substrate 202. An n-well 204 is formed as a layer on the upper part of substrate 202, which may be an epitaxial layer for example. In a preferred embodiment, well 204 spans multiple pixels in a two-dimensional array. However, it is within the scope of this invention to have a separate well for each pixel. Within each pixel, a p-type photodiode diffusion 206 is provided to store charge upon exposure to radiation. In addition, each pixel 200 includes a substrate tap 208 for holding the well 204 at a fixed voltage such as $V_{dd}$. Substrate tap 208 may be a highly doped n-type region for providing a low resistance ohmic contact to well 204. Substrate tap 208 connects to an appropriate power source via an appropriate contact or interconnect.

Various optical layers/elements may be provided on pixel 200—at least on diffusion 206. To simplify the diagrams these additional elements are not shown in FIGS. 2A and 2B. These optical elements may include, for example, a lens for optical collection of photons and filters for wavelength discrimination of photons (as used in color pixels).

It should be understood that while pixel 200 is depicted as having an n-type well and a p-type photodiode diffusion, the invention is not limited to this arrangement. Thus, well 204 could be a p-type region and diffusion 206 could be an n-type region. In either case, the concentration of dopant atoms in regions 204 and 206 should be chosen to create a depletion mode photodiode. In such photodiodes, radiation impinging on photodiode diffusion 206 causes generation of holes and electrons in the depletion region. Because the depletion region does not contain free charge carriers, these newly created holes and electrons are not immediately annihilated by combination with carriers of the opposite charge. Electrons drift to well 204 and holes drift to p-diffusion 206 where they are collected as free charge on of a capacitor $C_{pw}$ 207 defined at the p-n junction between the photodiode diffusion 206 and the well 204. The capacitance of $C_{pw}$ is sometimes referred to as the photodiode's "intrinsic capacitance."

During normal operation, pixel 200 is exposed to a source of radiation for a defined period of time. The flux of radiation (intensity) integrated over the length of the exposure time define an "integrated illumination" which is related to the amount of charge that builds up on the capacitor defined by the p-n junction of diffusion 206 and well 204. To "read" pixel 200, photodiode 206 is discharged so that the amount of stored charge can be determined. This charge specifies the integrated illumination which can be converted to an average radiation intensity based upon the known exposure time. The outputs of all pixels in the array are used to create a radiation intensity distribution or image.

In the illustrated embodiment, the pixel output is coupled to a charge integrator 210 by a connection line 212 and a transistor 214. While photodiode 206 is exposed to radiation, transistor 214 is switched off so that the charge accumulates in pixel 200. When pixel 200 is to be read, transistor 214 switches on so that the charge accumulated in photodiode diffusion 206 can flow over connection line 212 to charge integrator 210 and a capacitor 222 (connected in parallel with amplifier 210). Charge integrator 210 then measures the voltage across capacitor 222 and generates an output corresponding to the quantity of charge received from photodiode 206. Note that a switch 225 provided in parallel with capacitor 222 should be switched off during the read process so that a potential difference can be established across the plates of capacitor 222.

Concurrently with this reading process, photodiode 206 is "reset" to a "dark" state in which it is largely depleted of excess charge. In one example, in which $V_{dd}$ is 5V, photodiode diffusion 206 is reset to 1V which is the dark state (i.e., the voltage associated with no radiation being sensed by pixel 200). During reset, switch 225 is closed so that the reset voltage (the output of charge integrator 210) can be applied to line 212 and hence photodiode diffusion 206.

Fault analysis and correction block 24 may electronically determine if a given pixel is a faulty pixel. It may do this in various manners. For example, after a pixel is reset, that pixel may be sampled at a later time to determine whether its voltage has deviated from that of a dark state. Remember that on reset, a pixel photodiode is discharged such that the pixel assumes a voltage associated with the dark state (e.g., about 1V). If, upon sampling the reset pixel, it is found that the pixel voltage deviates from that associated with this dark state, the pixel may be deemed faulty by fault analysis and correction block 24. In this case, the output of that pixel is corrected or masked during subsequent images.

Returning to FIG. 2A, the reset mechanism for testing pixels is depicted. While pixel 200 is not exposed to light, charge integrator 210 discharges photodiode diffusion 206 over line 212 to the reset voltage $V_r$. Note that this requires switching transistor 214 on. The pixel is then disconnected from charge integrator 210 by turning off transistor 214 and photodiode 206 is allowed to remain idle for a fixed length of time. The charge on photodiode diffusion 206 is then read-out through charge integrator 210 by again closing switch 214 (FIG. 2B). The associated detection circuitry then determines whether pixel 200 is corrupted.

This technique will determine whether charge leaks between the photodiode diffusion 206 and well 204. If positive charge leaks into the diffusion (in the case of a p-type diffusion and n-type well), the pixel is found to be faulty during the above test. If uncorrected, the faulty pixel will appear as a "white pixel" (i.e., it will appear inappropriately bright).

This is not the only type of pixel defect of relevance here. Sometimes a pixel will be partially or completely blocked as by a dust particle remaining from fabrication. It is also possible that new particles will block the pixel during the CMOS imager's operating lifetime. Also, the optical elements on a pixel (lens, filter, etc.) may degrade and obstruct radiation. These types of failures result in "dark pixels" (i.e., the pixel appears inappropriately dark in an image). Unfortunately, obstruction type defects can not be tested without providing light to the array. Thus, an optical test must be employed. Various optical tests are known in the art and employed before CMOS imagers are shipped. Such tests usually involve resetting the pixels as described above, exposing pixels to known quantities of radiation and then reading their outputs. Variations of such tests may be employed to periodically test the imager over the course of its life. If any pixel so tested, outputs less charge than expected, the pixel is deemed faulty and must be corrected.

Still another type of pixel fault results from various intrinsic defects in the photodiode itself. These may result because the radiation collection region of the pixel is larger or smaller than desired (i.e., the photodiode diffusion size does not meet specifications), the dopant concentration in the photodiode deviates from a desired value, radiation reflects off metal proximate the pixel, etc. Each of these gain mismatch faults results in an erroneous pixel reading. If they cause excess charge to accumulate in the photodiode, they result in white pixels, and if they cause too little charge to accumulate in the photodiode, they result in dark pixels. Optical tests, as described above, may be employed to test for and classify such gain mismatches.

Regardless of the type of testing employed (optical or electronic), fault analysis and correction block 24 may operate in various manners. In one embodiment, block 24 merely determines whether a given pixel is faulty or not. In a more sophisticated version, block 24 not only determines whether a pixel is faulty, but what type of fault it harbors and just how faulty it actually happens to be. For example, in one embodiment, the system determines whether a given pixel is working correctly, is partially corrupted (white or dark), or is completely corrupted. It may make this determination depending upon how far the expected pixel intensity (photodiode voltage) deviates from an expected value.

Figure 3A:
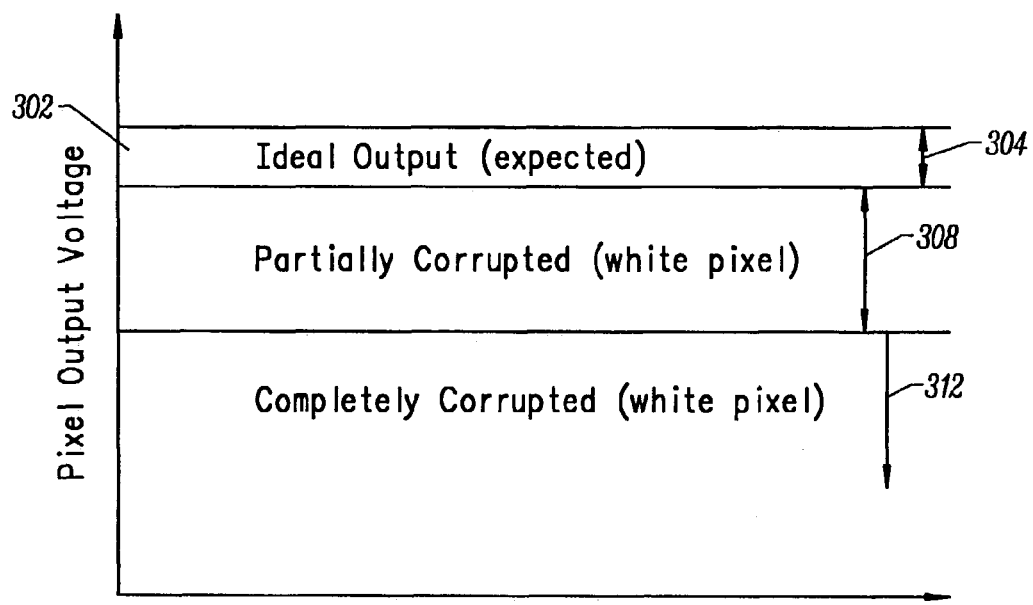
FIG. 3A is a hypothetical graph illustrating how the system may categorize pixels as partially or completely corrupted due to a leaky diode in accordance with one embodiment of this invention.
Figure 3B:
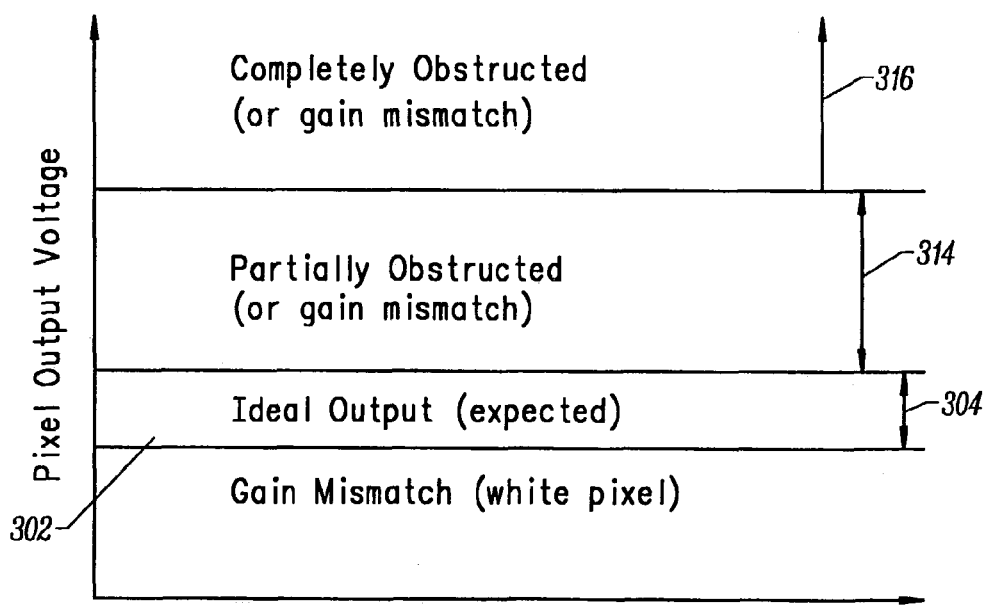
FIG. 3B is a hypothetical graph illustrating how the system may categorize pixels as partially or completely corrupted due to an obstruction or gain mismatch in accordance with one embodiment of this invention.

This embodiment is depicted graphically in FIGS. 3A and 3B. The vertical axes represent the pixel output voltage as output by charge integrator 210. Note that, in the case of a p-type photodiode diffusions, the greater the amount of illumination striking a pixel, the lower the voltage output by charge integrator 210. Conversely, lower amounts of illumination result in higher output voltages at charge integrator 210. The opposite is true for n-type photodiode diffusions. In FIG. 3A, the classes of pixel output encountered in a "dark test" are depicted. In the test, the pixels are reset and held in the dark for a defined period of time before their outputs are read. In FIG. 3B, the classes of pixel output encountered in an optical test are depicted. In this test, the pixels are reset and then exposed to a defined quantity of illumination for a defined period of time before their outputs are read.

In either case, the test begins with pixel 200 is reset via transistor 214 to an expected value 302 indicated in FIG. 3. If the measured output at charge integrator 210 falls within a correct working zone 304, the pixel is deemed correctly working. In the case of the dark test depicted in FIG. 3A, if the measured pixel intensity (voltage) falls below working zone 304, the pixel is deemed corrupted. The only question remaining is whether the pixel is "partially corrupted," in which case its output may be used in a modified fashion, or "completely corrupted," in which case its output can not be used under any circumstances. If the test pixel's output falls within within a partially corrupt zone 308, the pixel is deemed partially corrupted and treated accordingly. A pixel voltage lying below partially corrupted lower zone 308 is in a completely corrupted lower zone 312 and that pixel is deemed to be completely corrupted and treated accordingly.

Turning now to FIG. 3B, if the optical test shows that the test pixel's output voltage is above working zone 304, the pixel is obstructed or otherwise subject to a gain mismatch. If the output voltage is only slightly elevated from working zone 304 and lies in a zone 314, the pixel is deemed partially corrupted. If the output voltage is significantly elevated and lies in a zone 316, the pixel is deemed completely corrupted. In some cases, the optical test may reveal that the output voltage is lower than expected, in which case the pixel is not obstructed but is instead subject to a gain mismatch. Such gain mismatch might result from an oversized light collection surface on the pixel. In any event, such gain mismatch results in a partially or completely corrupted pixel depending upon the magnitude of the mismatch.

As will be explained in more detail below, partially corrupted pixels may be treated differently from completely corrupted pixels. In the simpler embodiment, pixels are never treated as partially corrupted, they are either working correctly or completely corrupted.

As suggested above, the output of charge integrator 210 will be an analog signal indicating the integrated illumination of a currently analyzed pixel. In order to easily analyze this signal and make any necessary corrections, the analog signal should first be converted to a digital signal. This is accomplished with analog-to-digital converter 18 as mentioned above. Preferably, analog-to-digital converter 18 is formed on the same chip with pixel array 12.

Figure 4A:
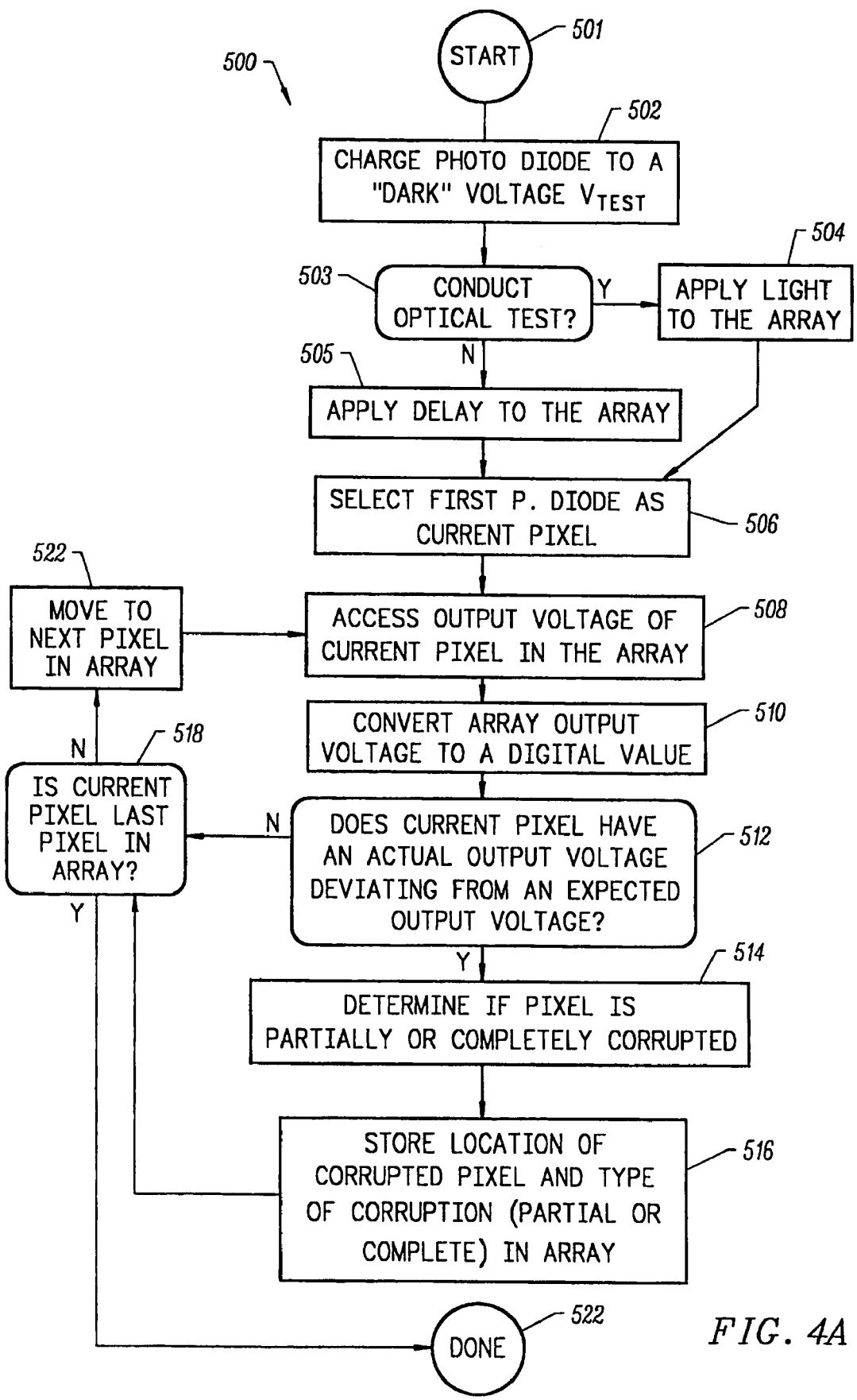
FIG. 4A is a process flow diagram illustrating a method by which the pixels of an array may be tested to determine whether they are corrupted.

FIG. 4A provides a process flow chart of a generic method 500 that may be employed to test pixels to determine if they are faulty. The flow chart applies to both optical and non-optical tests. The process 500 begins at 501 and in a step 502, the photodiodes in an array are charged to a reset voltage, $V_r$. As mentioned, this voltage corresponds to the state of the pixel when no radiation has struck it.

Next, at a step 503, a decision is made as to whether the test is an optical or non-optical test. If it is an optical test, the pixel array is exposed to a defined quantity of radiation at a step 504. Thereafter, process control is directed to a step 506 (described below). If the test to be conducted is a non-optical step, no radiation is provided. In that case, a dark current test is being conducted and the next step (step 505) delays reading the pixels for defined length of time that preferably corresponds approximately to the exposure time of the pixels while in use.

At this point, the process continues a step 506, where fault analysis and correction block 24 selects a first pixel to be evaluated. Evaluation involves assessing the output voltage of that pixel at a step 508. Thereafter, at a step 510, analog-to-digital converter 18 converts the analog value for that output voltage to a digital value. From this digital value, logic block 24 determines whether the pixel has an actual output voltage significantly deviating from an expected output voltage. See step 512. Next, logic block 24 may optionally determine if the pixel is partially or completely corrupted based upon any deviation from the expected output voltage. See step 514. Block 24 may also classify the corruption according to the classifications presented in FIGS. 3A and 3B.

Assuming that the system determines that the pixel is at least partially corrupted, it stores the location of the corrupted pixel and the type of corruption (partial or complete) in memory 26. This is accomplished at a step 516. If the pixel is partially corrupted, the system may also store some information about the type and degree of corruption. As explained in more detail below, this information is used to correct the partially corrupted pixel during readout. After the information associated with the corrupted pixel has been stored, block 24 determines whether the pixel under consideration is the last pixel in the array at a step 518. If so, the process is then completed at 526.

If decision step 518 is answered in the negative (i.e., the current pixel is not the last pixel in the array), the system moves to the next pixel in the array at a step 522. After that, process control returns to step 508 where the system accesses the output voltage of the new current pixel in the array.

Note that if decision step 514 is answered in the negative (i.e., the pixel under consideration is not corrupted), process control is directed to decision step 518 where the system determines whether the pixel under consideration is in fact the last pixel in the array.

Figure 4B:
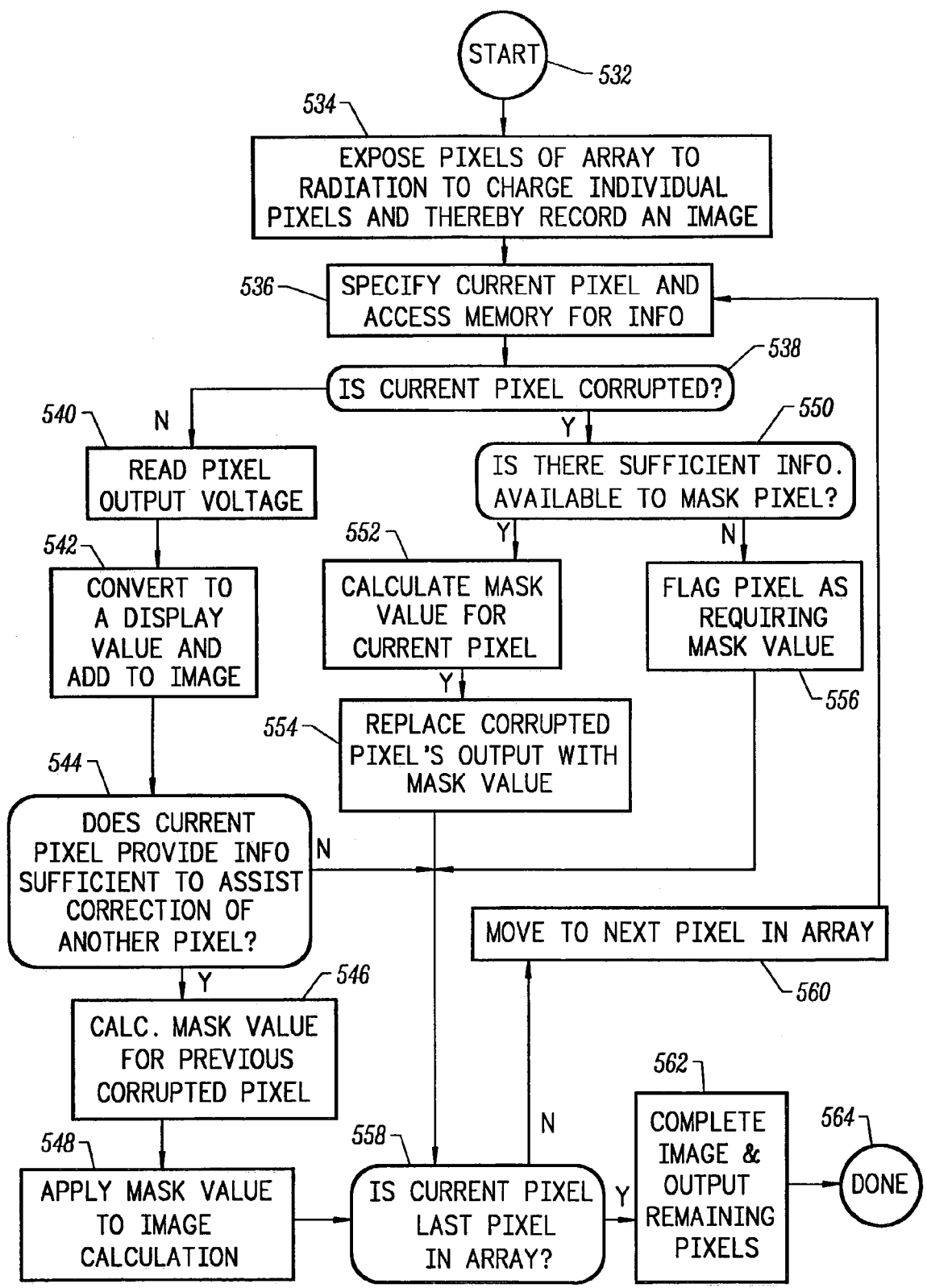
FIG. 4B is a process flow diagram illustrating how corrupted pixels are treated during image generation in accordance with one embodiment of this invention.

FIG. 4B presents a process flow diagram of one method 530 for masking faulty pixels during generation of an image. The process 530 begins at 532 and in a process step 534 exposes the pixels of the array to a radiation pattern defining an image. This charges the individual photodiodes of the individual pixels and thereby temporarily records the image. Next, at a process step 536, the system specifies a current pixel for analysis and accesses memory 26 for information concerning that pixel. From the information stored in memory, fault correction block 24 determines whether the current pixel is corrupted at a decision step 538.

Assuming that the current pixel is not corrupted, the system reads the output voltage of the pixel at a step 540. Thereafter, that output voltage is converted to a display value (possibly after conversion from an analog format to a digital format) and added to a currently generated image. This is accomplished at a step 542.

The system may then determine whether the current pixel output provides information sufficient to allow correction of another pixel at a decision step 544. As will be described below, some masking and correcting techniques for defective pixels require output information from adjacent (or nearby) uncorrupted pixels. Thus, if the pixel under consideration is adjacent to (or at least nearby) a corrupted pixel, the output information of the current pixel may be employed to allow masking of the corrupted pixel. Assuming that this is the case (i.e., decision step 544 is answered in the affirmative), the system calculates a mask value for the previously corrupted pixel at a step 546. Thereafter, the system applies that mask value to the image at the location of the corrupted pixel. This is accomplished at a step 548.

Returning to decision step 538, if it is answered in the affirmative (i.e., the current pixel is corrupted), the system next determines whether there is sufficient information available to mask or correct the current pixel. This is accomplished at a decision step 550. If there is sufficient information available to mask the current pixel (e.g., the output values of enough uncorrupted surrounding pixels are already known), the system calculates the mask value for that pixel at a step 552. Thereafter, it applies the mask value to the image being generated at a step 554 (i.e., it replaces the output of the corrupted pixel with a corrected or mask value). If decision step 550 is answered in the negative (i.e., there is insufficient information to mask the current pixel), the system flags the current pixel as requiring a mask value when sufficient information is available from nearby pixels. This is accomplished at a process step 556.

After either process step 554 or 556, the system determines whether the current pixel is the last pixel to be considered in the array or an appropriate subsection of the array. This is accomplished at a decision step 558. Note that process control is also directed to decision step 558 after process step 548. Still further, process control is directed to decision step 558 if decision step 544 is answered in the negative.

In any event, assuming that the current pixel is not the last pixel in the array (i.e., decision step 558 is answered in the negative), the system moves to the next pixel in the array for evaluation at a step 560. Process control is then redirected to step 536 where memory 26 is accessed for information about the new current pixel. Thereafter, the process proceeds as described above.

Assuming that the system determines at decision step 558 that the current pixel is in fact the last pixel in the array, it then completes the image and makes that image available for output (in the case of a full image or frame buffer). Alternatively, if the system employs a line buffer or some other buffer that holds less than an entire image, decision step 558 determines whether the current pixel is the last pixel in a line. If so, the line is made available for output. Regardless of the buffer details, the appropriate pixels (line, frame, etc.) are output at a process step 562. The process is then completed at 564.

Figure 4C:
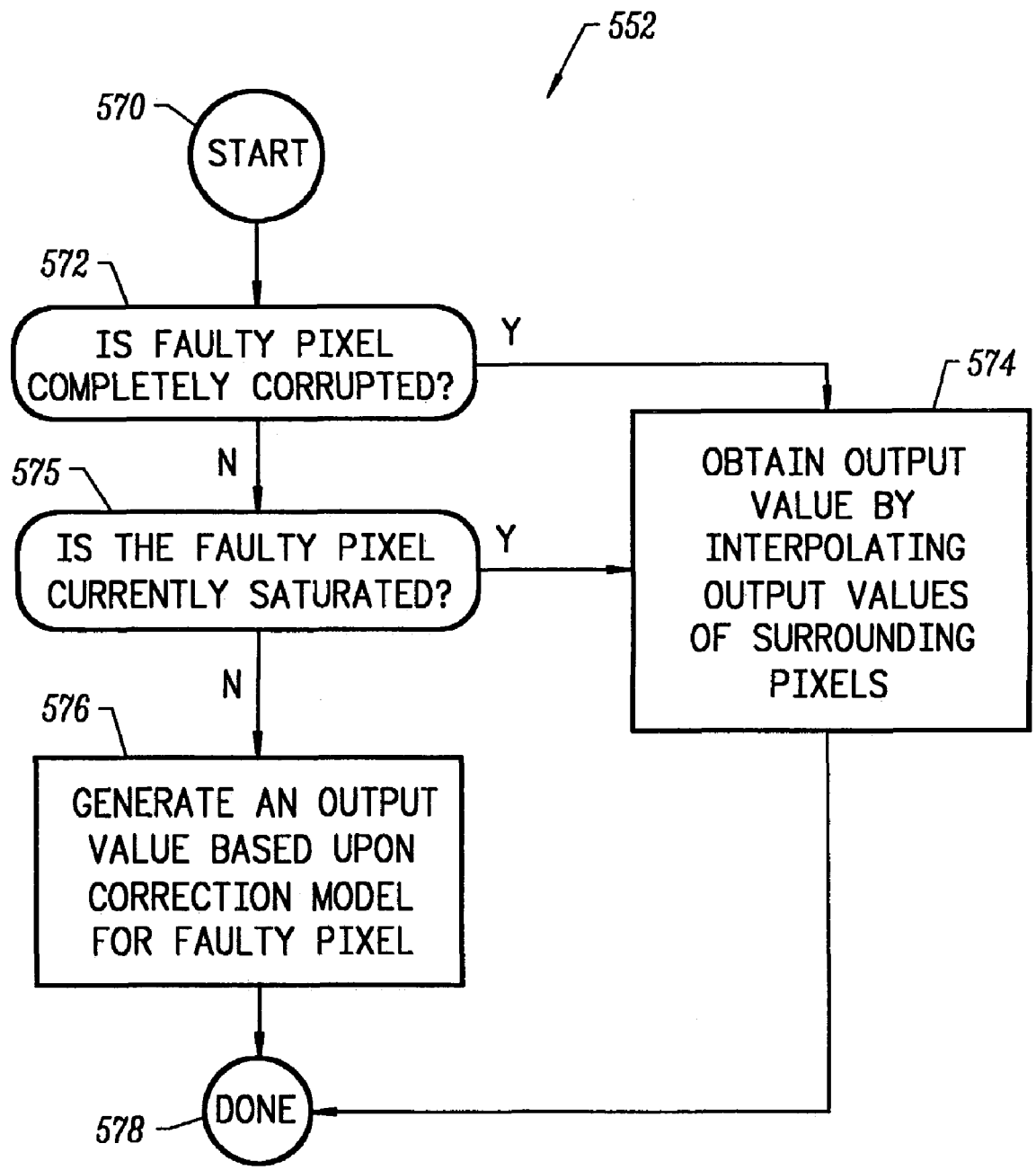
FIG. 4C is a process flow diagram detailing one technique by which corrupted pixels may have their outputs masked or corrected to generate a clear image.

A generic process by which a pixel is corrected at step 552 (or 546) is detailed in FIG. 4C. The process begins at 570 and then in a decision step 572, the system determines whether the current pixel is completely corrupted. Such information should be available from memory 26 and obtained during step 536 (FIG. 4B).

Assuming that the current pixel is deemed to be completely corrupted, the system generates a corrected output value for that pixel at a process step 574. Note that in the embodiment depicted in FIGS. 3A and 3B, a completely corrupted pixel would lie in one of ranges 312 and 316. In the embodiment depicted in FIG. 4C, the system may generate the corrected output value by interpolating output values of surrounding pixels (assuming those output values are available). If all of the surrounding pixels have not yet been evaluated, the final interpolated correction for the pixel at hand must await output values of the adjacent uncorrupted pixels. After step 574 is complete, the process is finished at 578.

Figure 5:
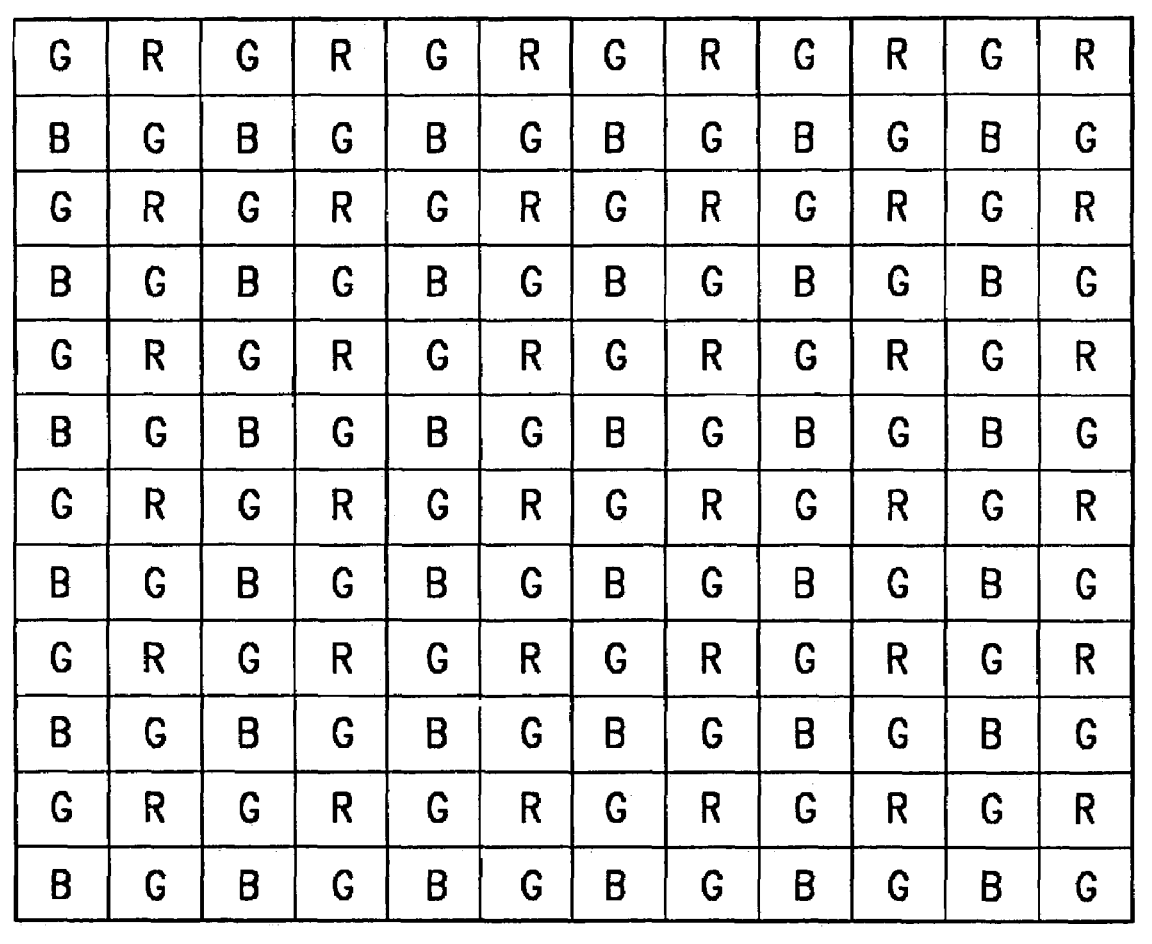

In the case of a color imager, the masking operation must be cognizant of the color of the pixel that is being corrected. FIG. 5 illustrates the layout of a conventional primary color pixel array (red, green, and blue). It should be understood that the invention may be practiced with other color pixel arrays such as those employing complementary color filters. In the embodiment of FIG. 5, green pixels are labeled "G," red pixels are labeled "R," and blue pixels are labeled "B." If the pixel deemed completely corrupted is green, then only green pixels should be chosen to provide the mask. The same holds true for red and blue pixels. Since the nearest neighbor pixels to faulty pixel will not be green, the next closest green pixels should be chosen for the mask. These may provided on the same line as the defective pixel and/or adjacent lines. In a very precise (but computationally expensive) operation, not only nearest neighbors but the next nearest neighbor pixels are employed to make the correction.

Assuming that the current pixel is deemed to be partially corrupted (i.e., decision step 572 is answered in the negative), the system next determines whether the pixel is saturated at a decision step 575. This means that the output of the pixel is now maximal and any further illumination will not increase the amount of charge stored in the diffusion. Thus, it is impossible to know how much radiation actually illuminated the pixel during exposure. Because of this, the output is unusable and the system must resort to masking the pixel with the outputs of other (surrounding) pixels. Hence, the saturated partially corrupted pixel is treated like a completely corrupted pixel. Returning to FIG. 4C, if step 575 is answered in the affirmative, process control moves to step 574 where the faulty pixel's output is masked by an interpolated output taken from surrounding pixels.

If decision step 575 is answered in the negative (i.e., the partially corrupted pixel is not saturated), the system generates a corrected output value based upon the deviation of the current pixel's test output from the expected test output. This is performed with aid of a correction model at a step 576. Note that the information for the correction model could be obtained at steps 508-514 of process 500 depicted in FIG. 4A. Note also that the output values of surrounding uncorrupted pixels may be used together with this deviation information to obtain the corrected output value at step 576. After step 576 is completed, the process is finished at 578.

Most simply, correction may involve adjusting the output of the partially corrected pixel by a fixed amount or percentage. For example, an electronic test may indicate that a pixel is 30% brighter than appropriate. The correction may simply involve decreasing the intensity of the pixel by an appropriate percentage in producing the image. Or an optical test may indicate that a pixel is 20% darker than appropriate. In this case, the correction may require increasing the intensity of the pixel by an appropriate amount in producing the image.

Generally, all necessary correction information will be stored in memory 26. The correction information will model the behavior of the partially corrupted pixel so that the appropriate correction factor or addend is provided for the current operating conditions. Thus, memory may have to store correction information for various conditions. Relevant conditions/parameters include operating temperature of the array, time of exposure to radiation, and the like.

The CMOS imagers of this invention may be deployed in various systems for military, scientific, business, and home applications. For example, they may be used in digital cameras, video recorders, night driving displays, etc. Generally, the systems will include, in addition to the CMOS imager chip, optics to capture an image and direct it onto the CMOS array. This may include one or more lenses, filters, etc. of the types conventionally employed in image capture systems. The optics and CMOS imager will be mounted in a casing such as a camera case. Further, the system may include a memory for temporarily storing captured images for later downloading to a display system. In some instances, the display system itself will form part of the overall imager system.

Although the foregoing invention has been described in some detail for purposes of clarity of understanding, it will be apparent that certain changes and modifications may be practiced within the scope of the appended claims. For example, while the specification has described certain pixel and chip architectures which accomplish the objectives of the present invention, many others which will be understood by those of skill in the art from the present disclosure to be within the spirit of the present invention may equally be used. For example, while the specification has exemplified a passive pixel, other pixel types such as active pixels (of photodiode or photogate type) containing on-pixel amplifiers also could benefit from use with the invention. In addition, the broad fault correction methods of this invention could profitably find use in non-CMOS technologies such as CCD technology, but the various system features might have to be implemented on separate chips. Therefore, the present embodiments are to be considered as illustrative and not restrictive, and the invention is not to be limited to the details given herein, but may be modified within the scope of the appended claims.

What is claimed is:

1. A method of testing a pixel to determine whether it is faulty, the method comprising:
   (i) electronically resetting a selected pixel to a defined charge;
   (ii) delay reading the selected pixel for a defined length of time that corresponds approximately to the exposure time of the pixel while in use;
   (iii) reading the selected pixel's output; and
   (iv) comparing the selected pixel's output to an expected value wherein the expected value is modified by the defined charge provided to the selected pixel, whereby if the selected pixel's output deviates from said expected value, designating the selected pixel as partially or completely corrupted.

2. The method of claim 1, wherein if the selected pixel is partially corrupted pixel, it is to be imaged by a first technique during readout and if the selected pixel is completely corrupted, it is to be imaged by a second technique during readout.

3. The method of claim 2, wherein determining whether the selected pixel is partially or completed corrupted comprises determining how far the selected pixel's output deviates from the expected value, such that if the selected pixel's output deviates by more than a defined amount from the expected value deeming the selected pixel to be completely corrupted and if the selected pixel's output deviates by no more than a defined amount from the expected value deeming the selected pixel to be partially corrupted.

4. The method of claim 2, wherein the first correction technique comprises adjusting the output of the selected pixel and wherein the second correction technique comprises replacing the output of the selected pixel with an average of the outputs of pixels located about the selected pixel.

5. The method of claim 1, further comprising:
selecting a pixel to test.

6. The method of claim 1, wherein the electronically resetting comprises:
switching on a transistor associated with the selected pixel;
discharging a photodiode associated with the selected pixel; and,
switching off the transistor associated with the selected pixel.

7. A method for characterizing a pixel, comprising:
setting a pixel voltage to a reset voltage, wherein the reset voltage corresponds to the state of the pixel when the pixel has been exposed to substantially no radiation, the setting operation comprising switching on a transistor associated with the selected pixel, discharging a photodiode associated with the selected pixel, and switching off the transistor associated with the selected pixel;
measuring the output voltage of the pixel;
determining if the pixel is partially corrupted or completely corrupted, wherein the determination of partial or complete corruption is based at least partially on the amount of deviation between the output voltage and the defined voltage;
determining if the pixel is partially saturated or completely saturated; and,
applying a type of pixel correction mechanism.

8. The method of claim 7, wherein the type of pixel correction mechanism applied is based on whether the pixel is partially or completely corrupted.

9. The method of claim 7, wherein the type of pixel correction mechanism applied is based on whether the pixel is partially or completely saturated.

10. The method of claim 9, wherein determining if the pixel is partially saturated or completely saturated only occurs if the pixel is determined to be partially corrupted.

11. The method of claim 10, wherein if the pixel is partially corrupted and not saturated, it is to be imaged by a first technique during readout and if the selected pixel is completely corrupted or both partially corrupted and saturated, it is to be imaged by a second technique during readout, wherein the first and second techniques are different.

12. The method of claim 11, wherein the second technique is masking.

13. The method of claim 12, wherein the first technique comprises adjusting the output of the pixel by a fixed percentage.

14. The method of claim 11, further comprising storing the location and the characterization of the pixel.

15. An apparatus for characterizing a pixel, comprising:
means for setting a pixel voltage to a reset voltage, wherein the reset voltage corresponds to the state of the pixel when the pixel has been exposed to substantially no radiation;
means for charging the pixel with a defined charge;
means for measuring the output voltage of the pixel charged with the defined charge;
means for waiting a defined length of time that corresponds approximately to the exposure time of the pixel while in use between charging the pixel and measuring the output voltage; and,
means for determining if the pixel is partially corrupted or completely corrupted, wherein the determination of partial or complete corruption is based at least partially on the amount of deviation between the output voltage and an expected value that is modified by the defined charge.

16. A method of testing a pixel comprising:
(i) selecting a pixel to test;
(ii) switching on a transistor associated with the selected pixel;
(iii) discharging a photodiode associated with the selected pixel;
(iv) switching off the transistor associated with the selected pixel;
(v) waiting for a for a defined length of time that corresponds approximately to the exposure time of the pixel while in use;
(vi) reading the selected pixel's output;
(vii) comparing the selected pixel's output to an expected value wherein the expected value is modified by the defined charge provided to the selected pixel; and,
(viii) determining if the pixel is partially corrupted or completely corrupted.

17. The method of claim 16, wherein discharging the photodiode resets the photodiode to a reset voltage corresponding to a voltage associated with no radiation being sensed by the pixel.

18. An apparatus for characterizing and correcting a pixel, the apparatus comprising:
a pixel array including a plurality of uncorrupted pixels, completely corrupted pixels, and partially corrupted pixels, each pixel comprising a photodiode for measuring a radiation intensity and a transistor;
an analog-to-digital converter for converting an analog pixel output to a digital output signal;
a fault analysis and correction block configured to pass through the digital output of an uncorrupted pixel, mask the digital output of a corrupted pixel, and mask or adjust the digital output a partially corrupted pixel based on whether the output is saturated; and,
a memory for storing fault and correction data.

19. The apparatus of claim 18, further comprises a voltage test mechanism comprising a defined illumination source and a delay timer.

20. The apparatus of claim 18, wherein the fault and correction data includes the location of the pixel, type of corruption, and correction information.

* * * * *